UNITED STATES PATENT OFFICE.

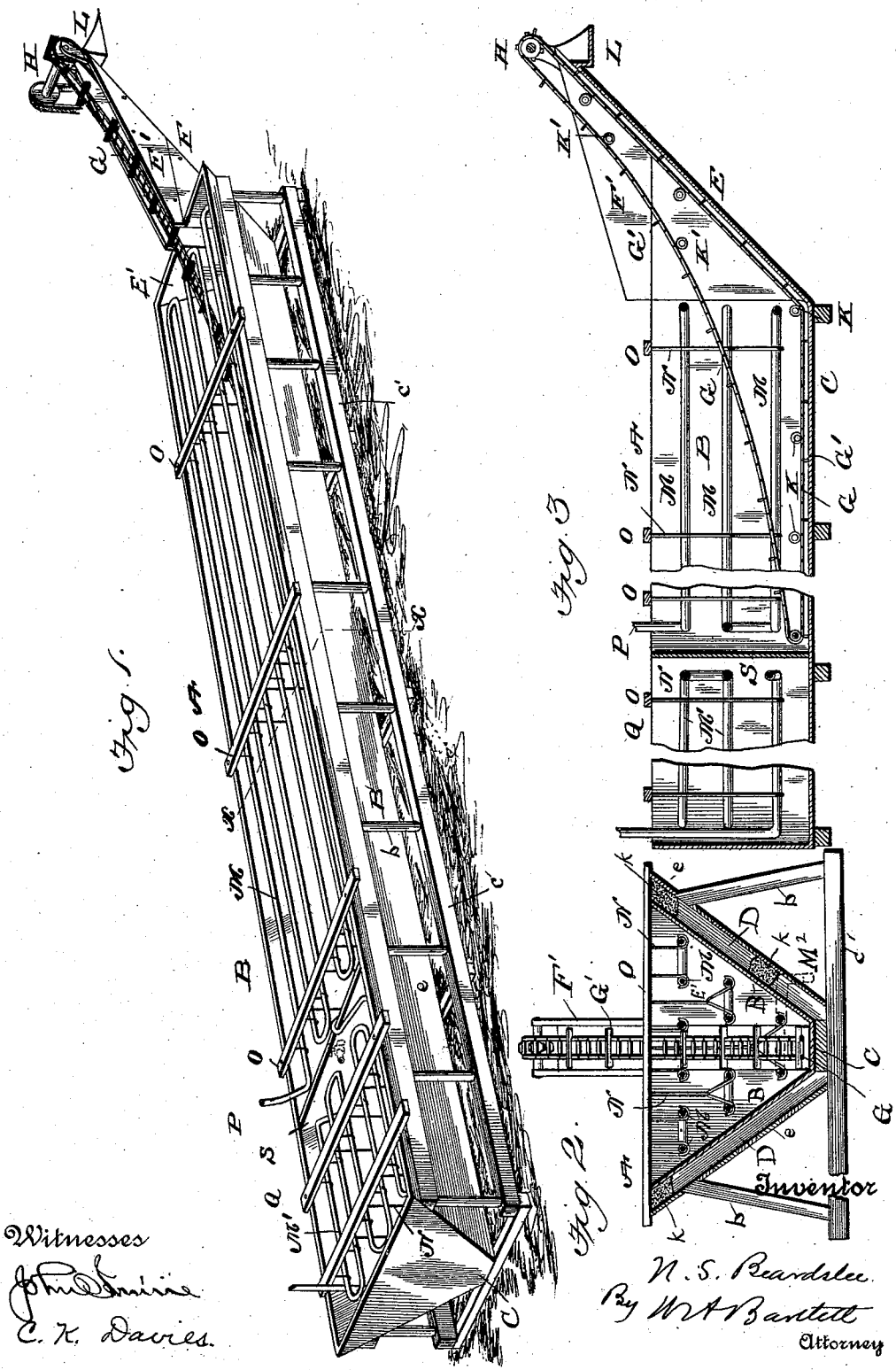

NATHAN S. BEARDSLEE, OF WARSAW, NEW YORK.

SALT-EVAPORATOR.

SPECIFICATION forming part of Letters Patent No. 536,180, dated March 26, 1895.

Application filed September 8, 1894. Serial No. 522,486. (No model.)

*To all whom it may concern:*

Be it known that I, NATHAN S. BEARDSLEE, residing at Warsaw, in the county of Wyoming and State of New York, have invented certain new and useful Improvements in Salt-Evaporators, of which the following is a specification, reference being had therein to the accompanying drawings.

This invention relates to evaporating pans or grainers for the manufacture of salt from brine.

The object of the invention is to produce a salt pan in which the evaporation may be done economically and the salt may be removed mechanically; also a pan wherein the feed brine may be partially heated before passing to the evaporation pan or heater; also to prevent radiation from the pan or grainer.

Figure 1 is a perspective of a grainer illustrating my improvements. Fig. 2 is a cross section about at line $x,x$, of a pan, showing the supports and covering to prevent radiation. Fig. 3 is a broken central longitudinal section of a pan and warming tank, partly broken away.

A indicates the body of the pan or grainer. The body is composed preferably of steel plates, riveted together, with sides B, B, inclined at not far from forty-five degrees to the perpendicular. The bottom C, is preferably horizontal, and may be about one or two feet wide in a pan of fourteen feet width and seven feet deep, but these proportions are not essential.

The outside of the metallic pan body is supported by timbers D, which extend from top to base, following the inclination of the sides of the pan. The timbers are covered by a wooden sheathing, $e, e$, and the intervals between timbers D, and between the pan and sheathing, are filled with non-conducting material, $k$, such as earth, sawdust, or the like.

The timbers D, are supported by braces $b$. These braces $b$, may be vertical, and supported on the stringers $c'$, as in Fig. 1, or the braces may be inclined, and rest on girders $c$, as in Fig. 2. A pan jacketed in this way presents a large evaporating surface at the top, and permits little waste of heat by radiation.

The ends of the pan are preferably vertical. The end E' has a spout or chute F, preferably with vertical sides and an inclined bottom forming a continuation of the bottom C, of the pan, and of a similar width. The spout F may be of steel plates to the height of the pan A, and if prolonged above the height of the pan, as at F', the upper portion may be of wood, as the iron or steel plates which are tolerably permanent when constantly covered by brine, soon rust if they are alternately wet and dried, while wood is less objectionable in this respect.

An endless chain carrier is arranged inside the pan, and runs up the chute or spout at the end. The chain is preferably the usual sprocket chain G, provided with "flights," shoes, or scrapers G', which scrapers are preferably of a length to extend across the horizontal bottom C of the pan.

The sprocket or conveyer chain is driven from sprocket wheel H, which is propelled from any convenient source of power. The chain near the bottom of the pan is held down to its work by pulleys K, which are arranged on shafts extending across the pan, and the slack chain is supported on its return movement by other idler pulleys K'.

The salt formed in the pan or grainer falls mainly on the inclined sides B, and slides to the bottom of the pan, whence the endless conveyer drags it up the inclined bottom spout F, and drops it onto the drain board L, whence it is removed in any usual or suitable manner.

The heat for evaporating purposes is preferably supplied by steam pipes M, which extend back and forth in the pan. These pipes M are supported by hangers N from the cross bars O. I have shown six pipes in the upper layer, four in the next, and two pipes near the bottom of the pan. This arrangement I have found in practice to be good, although others might be used. The steam is introduced at the inlet pipe P, and preferably goes through the whole set of pipes. The hottest live steam traverses the upper pipes, and becomes cooler as the heat is absorbed by the brine.

I preferably have a brine heating tank connected with the pan. This may be a compartment Q, divided from the evaporating pan by partition S. The pipes M' may be arranged in this heating tank the same as in the evaporating pan, and the steam, cooled down to a comparatively low temperature, by passing through the pipes in the evaporating pan, may be conducted through these pipes M'. The brine may be transferred from the heater to the evaporator in any convenient manner, as by a pipe, pump, or siphon.

If desirable, a drip pipe M², indicated in dotted lines Fig. 2, may be connected with the steam pipes, and lead outside the pan.

As the heating compartment has no raking attachment, it is desirable that the salt shall not crystallize therein. Therefore only the exhaust steam, or water, which has cooled down to a comparatively low temperature, passes through the pipes.

The pan A, being filled with brine and steam admitted to pipes M, the salt will crystallize and slide down the inclined sides onto the level bottom C of the pan. The endless chain carrier G moves slowly along the surface of this floor or bottom C, and drags the salt up the inclined end of chute F, and drops it on the board L; and thence into drainage bins. The raking is thus purely mechanical, and the apparatus requires little attention.

What I claim is—

1. The evaporating pan having inclined sides and a flat bottom, and a chute or spout at one end, of the width of this bottom, said chute having perpendicular sides and an inclined bottom, and an endless chain conveyer running in the pan and spout and having scrapers of the width of the flat floor and engaging the said floor, all combined substantially as described.

2. The evaporating pan having a steel body with inclined sides suitably supported, and a narrow flat bottom, and a projecting chute at one end of the width of the flat pan bottom, said chute having its sides lined with wood above the pan level, and an endless chain conveyer extending along the pan bottom and inclined bottom of the chute, and having scrapers extending across the bottom all combined substantially as described.

3. The salt evaporating pan having raking apparatus and having a heating pipe therein arranged with return bends so that steam from a single inlet pipe passes through the entire system, and a heating chamber alongside said evaporator having pipes therein through which the exhaust from the evaporator passes, all combined substantially as described.

In testimony whereof I affix my signature in presence of two witnesses.

NATHAN S. BEARDSLEE.

Witnesses:
R. W. HUMPHREY,
W. J. SERVICE.